United States Patent
Fit-Florea et al.

(10) Patent No.: US 8,005,884 B2
(45) Date of Patent: Aug. 23, 2011

(54) RELAXED REMAINDER CONSTRAINTS WITH COMPARISON ROUNDING

(75) Inventors: Alexandru Fit-Florea, Albalulia (RO); Debjit Das-Sarma, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 987 days.

(21) Appl. No.: 11/869,426

(22) Filed: Oct. 9, 2007

(65) Prior Publication Data

US 2009/0094308 A1 Apr. 9, 2009

(51) Int. Cl.
*G06F 7/38* (2006.01)
(52) U.S. Cl. ......................... 708/497; 708/551
(58) Field of Classification Search .................. 708/497, 708/504, 551
See application file for complete search history.

(56) References Cited

U.S. PATENT DOCUMENTS

| | | | |
|---|---|---|---|
| 5,568,412 A | 10/1996 | Han et al. | |
| 5,737,255 A * | 4/1998 | Schwarz | 708/551 |
| 5,764,555 A | 6/1998 | McPherson et al. | |
| 6,205,461 B1 | 3/2001 | Mansingh | |
| 2007/0162535 A1 * | 7/2007 | Wait | 708/497 |

OTHER PUBLICATIONS

"Accelerating Correctly Rounded Floating-Point Division when the Divisor is Known in Advance"; Brisebarre, et al., IEEE Transactions on Computers, vol. 53, No. 8, Aug. 2004; pp. 1069-1072.
"A Comparison of Three Rounding Algorithms for IEEE Floating-Pointmultiplication"; Even, et al.; This paper appears in Computer Arithmetic, 1999. Proceedings, 14th IEEE Symposium, pp. 225-232.

* cited by examiner

Primary Examiner — Tan V Mai
(74) Attorney, Agent, or Firm — Rory D. Rankin; Meyertons, Hood, Kivlin, Kowert & Goetzel, P.C.

(57) ABSTRACT

A system and method for efficient floating-point rounding in computer systems. A computer system may include at least one floating-point unit for floating-point arithmetic operations such as addition, subtraction, multiplication, division and square root. For the division operation, the constraints for the remainder may be relaxed in order to reduce the area for look-up tables. An extra internal precision bit may not be used. Only one quotient may be calculated, rather than two, further reducing needed hardware to perform the rounding. Comparison logic may be required that may add a couple of cycles to the rounding computation beyond the calculation of the remainder. However, the extra latency is much smaller than a second floating-point multiply accumulate latency.

20 Claims, 9 Drawing Sheets

606

Now the goal is determining whether $r_i$ is in:
- $[f, f + \frac{1}{2}\ \text{ulp})$, or
- $(f + \frac{1}{2}\ \text{ulp}, f + 1\ \text{ulp})$, or
- $[f+1\ \text{ulp}, f + 1\frac{1}{2}\ \text{ulp})$.

This can be expressed in terms of $r_i$'s position:
- $[f, f + \frac{1}{2}\ \text{ulp})$      <=>    $r_i < b \times (\frac{1}{2}\ \text{ulp})$
- $(f + \frac{1}{2}\ \text{ulp}, f + 1\ \text{ulp})$,    <=>    $r_i > b \times (\frac{1}{2}\ \text{ulp})$ and $r_i < b \times (1\ \text{ulp})$
- $[f + 1\ \text{ulp}, f + 1\frac{1}{2}\ \text{ulp})$    <=>    $r_i > b \times (1\ \text{ulp})$ and $r_i < b \times (1\frac{1}{2}\ \text{ulp})$ But, since the initial constraint is that $q_i$ is accurate to +/- $1\frac{1}{2}$ ulp, we already have that $r_i < b \times (1\frac{1}{2}\ \text{ulp})$, and the last condition becomes:
- $[f+1\ \text{ulp}, f + 1\frac{1}{2}\ \text{ulp})$    <=>    $r_i > b \times (1\ \text{ulp})$ In a manner similar with the 1 ulp case, the problem reduces to determining:
- sign of (mantissa of $r_i$ - mantissa of $b$) (i.e. -1, 0, or 1);
- whether ((exponent of $r_i$) - ((exponent of $b$) - $(p)$)) is:
  - < 0
  - = 0
  - > 0 (it can only be 1 in this case)

608

Finally, the interval in block 604 where $q_{actual}$ may reside:

If $r_i > 0$, and
if $(r_i < b \times (\frac{1}{2}\ \text{ulp}))$, then $q_{actual}$ resides in interval 4, and rounded $q_i = f$, or
if $(r_i > b \times (1\ \text{ulp}))$, then $q_{actual}$ resides in interval 6, and rounded $q_i = f + 1\frac{1}{2}\text{ulp}$, or
$q_{actual}$ resides in interval 5, and rounded $q_i = f + 1\text{ulp}$.

If $r_i < 0$, and
if $(\text{abs}(r_i)) < b \times (\frac{1}{2}\ \text{ulp})$, then $q_{actual}$ resides in interval 3, and rounded $q_i = f$, or
if $(\text{abs}(r_i)) > b \times (1\ \text{ulp})$, then $q_{actual}$ resides in interval 1, and rounded $q_i = f - 1\frac{1}{2}\text{ulp}$, or
$q_{actual}$ resides in interval 2, and rounded $q_i = f - 1\text{ulp}$.

*FIG. 6B*

RELAXED REMAINDER CONSTRAINTS WITH COMPARISON ROUNDING

BACKGROUND OF THE INVENTION

1. Field of the Invention

This invention relates to computer systems, and more particularly, to finding an efficient method to achieve correct rounding for computer arithmetic.

2. Description of the Relevant Art

A computer system may comprise multiple processor cores wherein each core may have a floating-point unit to perform these arithmetic operations. The arithmetic operations may include addition, subtraction, multiplication, division and square root. The rounded result is represented by the computer system with a maximum limit of significance. Each processor core uses a finite number of bits to represent a floating-point numeric value. The finite number of bits used by a processor core is referred to as the processor core's precision. In addition, the accuracy of a floating-point value is referred to how close the processor core's representation of a numeric value is to an infinitely precise representation. It is desired to have the processor representation of the rounded result be as accurate as possible. Furthermore, a processor core may be configured to perform the floating-point arithmetic operations in more than one precision (e.g. single-precision, double-precision, or extended-precision).

A floating-point number is represented in a base number system that defines the radix of the system. For example, the decimal system with base 10 is a common base system. Modern computers use a binary system with base 2. Each base number system has a maximum number of digits that may be used to represent a number. For example, the decimal system uses ten digits, 0-9, and the hexadecimal system uses sixteen digits, 0-9 and a-f. As used herein, for simplicity sake, digits may refer to the digits of any base number system, although digits for a binary system are referred to as bits and digits for a hexadecimal system are referred to as hexadecimal digits, and so forth. Besides the base, three other entities are used to represent a floating-point number. First, the sign is a string used to represent the plus or minus sign. Second, a mantissa is a string of digits used to represent the number. The mantissa is a signed entity meaning it represents a positive or a negative number. Third, an exponent is used to record the position of the most significant digits, or the first non-zero digits, of the mantissa. The value of the floating-point number is found by multiplying the sign and mantissa by the base raised to a power set by the exponent. The floating-point number is referred to as normalized if its mantissa is zero for zero values, or, for non-zero values, its mantissa has a non-zero value in the left-most significant digit of the mantissa. For non-zero values, a non-normalized floating-point number may be normalized by, first, shifting the floating point until the left-most significant digit of the mantissa is non-zero, and, second, adjusting the exponent in order that the floating-point number represented by the above combination of mantissa, base and exponent, remains constant.

A floating-point number represented in a processor does not have an infinite number of digits in the mantissa. A register may hold the value of the normalized mantissa and it is limited to a certain number of memory storage locations, or bits. The number of bits, p, explicitly or implicitly used by a processor to represent the mantissa is referred to as the precision. The result of an arithmetic operation may require more than p bits for the representation of their respective mantissas. Therefore, it is required to find an accurate representation of such mantissas with only p bits.

Older processors truncated the extra bits beyond the most significant p bits. Modern processors perform rounding to obtain a more precise representation. For example, when rounding to the nearest machine representable number is desired, a value of one may be added to the least significant digit of the p digits of a mantissa if the digits following the p most significant digits contain a value more than one-half of the least significant digit of the p digits. When the value is less than one-half, the digits following the p most significant digits are simply truncated. When the value is equal to one-half, the action taken depends on the rounding technique being used. A common standard used for both floating-point number representation and rounding is the IEEE Standard 754 for Binary Floating-Point Arithmetic. Also, a computing system has a limit to the smallest increment or decrement of a floating-point number representation which is referred to as the unit in the last place (ulp).

Rounding methods, which may include one of a variety of algorithms, are used after the arithmetic operation is completed. Table-lookup(s) may be used to aid or complete the operation. One variable for an algorithm used in a rounding method may be the size of a table-lookup. As the size of a table-lookup increases, the accuracy of the result computed at intermediate steps increases, the number of subsequent computations decreases, but also, the die-area requirement for the table-lookup increases. An uncompressed table-lookup with a precision of 13 bits may require only half the area of a 14 bit table. However, more subsequent computations may be required due to the less accuracy of the 13-bit table-lookup. The rounding method may have conditions for the previous operations to complete prior to the use of the rounding method. For example, for division of two operands a and b, prior conditions may include the number of quotients to find (e.g., 1/b, a/b, or both) and the precision or accuracy of the quotients. Afterwards, a number of steps need to be taken to round the result of the calculation, and the number of steps may differ depending on the rounding method chosen.

Two examples of current rounding methods include the FMAC-based method, see P. Markstein, IA-64 and Elementary Functions: Speed and Precision, Hewlett-Packard®/Prentice-Hall, 2000, and the rounding used in floating-point units of AMD's K-8 microprocessors, see S. Oberman, Floating Point Division and Square Root Algorithms and Implementation in the AMD-K7 Microprocessor, Proceedings of the 14th IEEE Symposium on Computer Arithmetic, April 1999, pp. 106-115. The method described by Markstein requires the calculation of two quotients in parallel followed by a floating-point multiply accumulate unit (FMAC) operation for the remainder. Although this method's hardware requirements are a FMAC unit and a state machine, it requires two FMAC latencies to determine the rounded result. The K-8 method uses extra precision bits for internal calculations that are unseen to the user. The extra precision bits allows the internal calculations to have smaller bounded errors and only one remainder calculation needs to be performed. However, much extra hardware may be required for the extra precision bits such as a larger table-lookup or more die area for the multiplier circuitry.

In view of the above, an efficient method for floating-point rounding is desired.

SUMMARY OF THE INVENTION

Systems and methods for efficient floating-point rounding in computer systems are disclosed.

In one embodiment, a computer system includes one or more microprocessors with a floating-point unit (FPU). For a floating-point calculation, such as division, due to the representation of the operands and the result by registers with a finite number of bits, the real numbers may need to be rounded to the nearest accurate representation possible for the processor. In order to achieve an accurate representation in an efficient manner, the constraints for the remainder may be relaxed in order to reduce the area for look-up tables. An extra internal precision bit may be deemed unnecessary, so hardware resource growth is further reduced. Only one quotient may be calculated, rather than two, again, reducing design complexity, computation time, and die area required to perform the is rounding. Comparison logic may be required that may add a couple of cycles to the rounding computation beyond the calculation of the remainder. However, the extra latency may be much smaller than a second FMAC latency. Also, there may be hardware savings with this approach.

In one embodiment, a processor includes a floating-point unit configured to perform a calculation using operands and a lower accuracy. The unit further receives a calculated first result with the lower accuracy, wherein the first result is an approximation of an actual result. The floating point unit determines a sign and a magnitude of an error between the first result and the actual result and determines a second result to be selected from a selection of three choices including (i) the first result, (ii) the first result less one ulp and (iii) the first result added to one ulp. Finally, the second result is determined to correspond to one of the three choices, wherein the second result is a floating-point rounded quotient of a floating-point division calculation.

These and other embodiments will become apparent upon reference to the following description and figures.

BRIEF DESCRIPTION OF THE DRAWINGS

FIG. 6A-6B are block diagrams illustrating one embodiment of a algorithm for efficient comparison rounding.

Figure 1A:
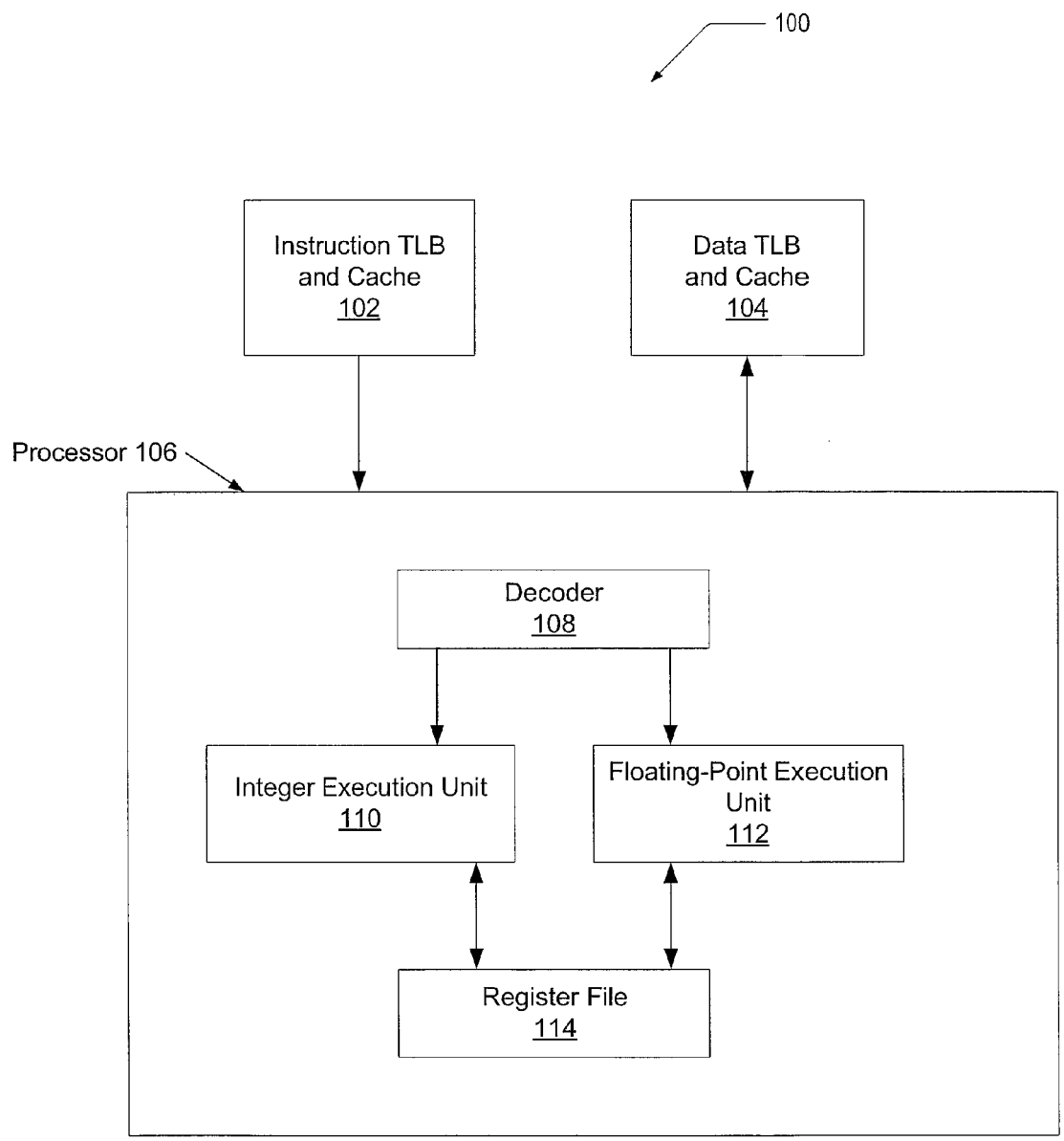
FIG. 1A is a generalized block diagram illustrating one embodiment of a processor with a floating-point execution unit.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Referring to FIG. 1A, a computing system 100 is shown. A generalized block diagram of a processor 106 is included in system 100. In one embodiment, the processor is coupled to an i-cache 102 and a d-cache 104 in order to respectively fetch instructions of a software application to execute and load and store data that may be modified during the execution of the fetched instructions. Processor 106 may include a decoder 108 for decoding the fetched instructions in order to determine what operation needs to be performed and whether or not an arithmetic operation uses integer values or floating-point values. For the first case, an integer execution unit 110 may be used to perform the integer arithmetic operations such as addition and subtraction. In the latter case, a floating-point execution unit 112 may be used to perform floating-point arithmetic operations such as addition, subtraction, multiplication, division and square-root. Unit 112 may need to perform rounding of the final result due to storing the value in a register with a finite number of bits. A method may be used that relaxes the precision requirements of the calculation without losing accuracy of the final rounded result. Such a method is described later. Finally, a register file 114 is used to store the architecture state of processor 106 such as stored values of general-purpose registers that may be modified during the execution of a software application.

Figure 1B:
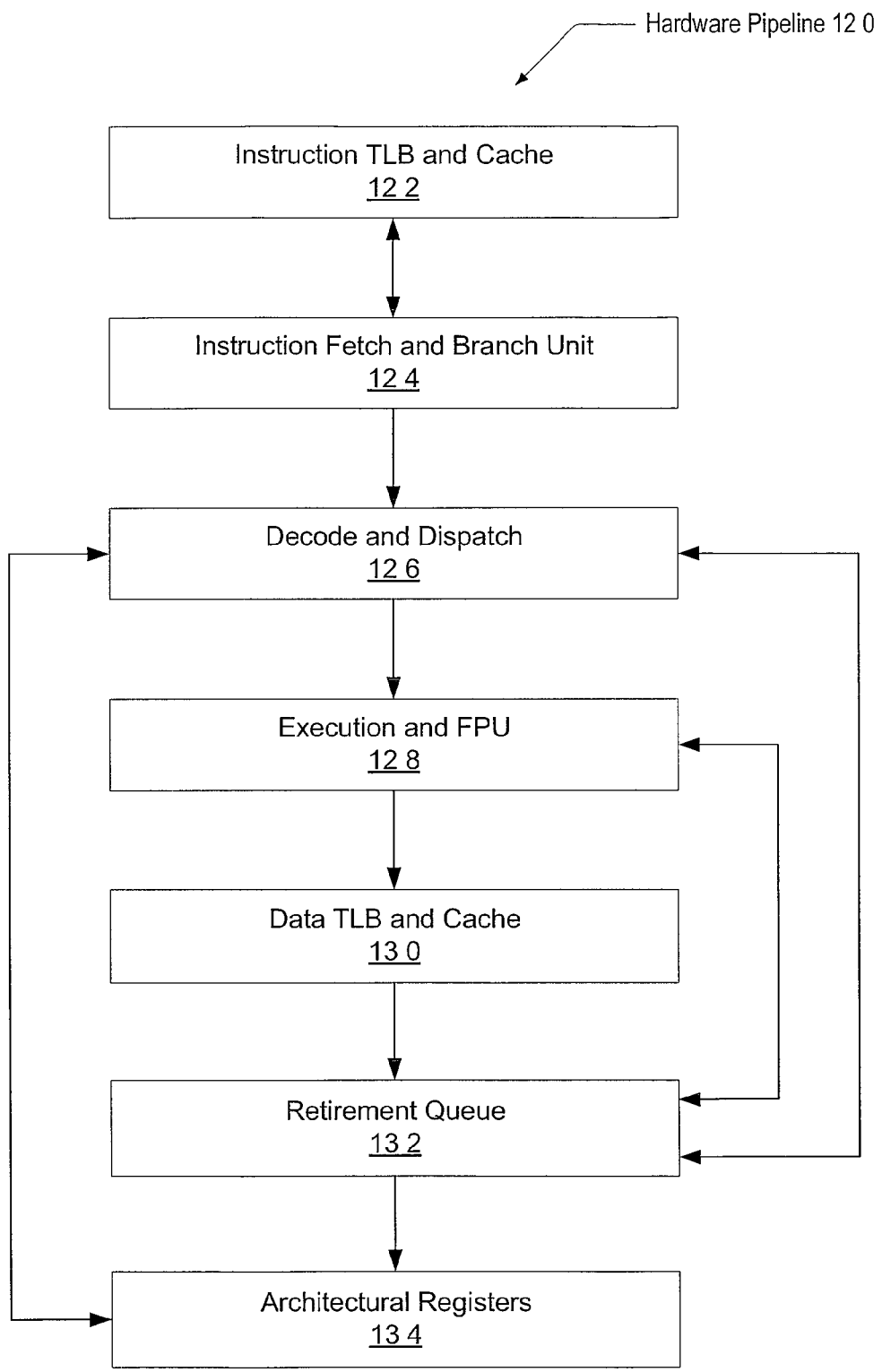
FIG. 1B is a block diagram illustrating one embodiment of the stages and hardware of a multi-stage pipeline including a FPU execution stage.

FIG. 1B illustrates one embodiment of the hardware of a pipeline 120. The hardware may be part of one core of a multi-core microprocessor. In block 122, the i-TLB is loaded with instruction addresses and their respective translations. The i-cache is loaded with instructions of a program. There may be one or more levels of TLB and caches before access to main memory is necessary. One or more instructions may be fetched by use of a program counter assigned by the Instruction Fetch logic 124 and possibly a branch prediction mechanism. The instructions are loaded into registers. In the next clock cycle, the Decode block 126 decodes the opcodes of the one or more instructions and the Dispatch logic determines which instructions may be dispatched to functional units in the next clock cycle. The logic determines which instructions have available source operands and have a sufficient functional unit ready for use. The dispatcher may dispatch instructions out of program order in an attempt to keep the pipeline filled and reduce the occurrence of CPI losses or reduce the penalty of CPI losses. The Execution block 128 contains the functional units for execution of the instructions including possible zero detection or comparison logic used for conditional instructions such as branches. Also included is a floating-point unit (FPU) for arithmetic operations. In other embodiments, the FPU may be shared among other pipelines, for example, when it is determined the floating-point operations occur less frequently as integer operations.

In the next clock cycle, memory access instructions index the d-TLB and d-cache block 130. Like the i-TLB and i-cache, there may be one or more levels of TLB and caches before access to main memory is necessary. The retirement queue 132, possibly a FIFO queue, stores the results of the instructions as they complete. Results of the instructions may be data-forwarded to other instructions prior to being written in the retirement queue. The retirement queue ensures in-order retirement by writing results of the instructions into the architectural registers 134 in their original program order.

Figure 2:
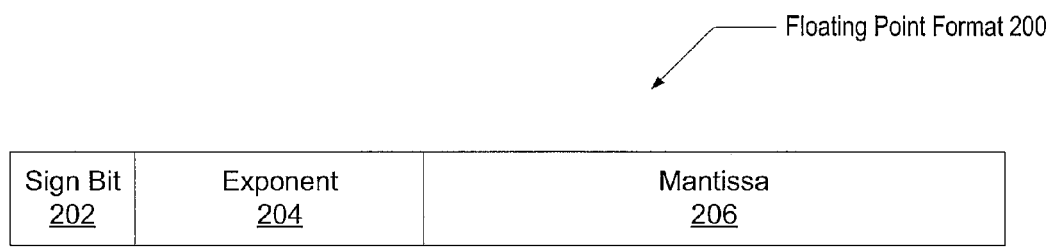
FIG. 2 is a block diagram illustrating one embodiment of the fields needed to represent a floating-point number in a processor.

Turning to FIG. 2, one embodiment of a representation of floating-point number 200 in a processor is shown. Each field may be a separate register in a processor or a bit-field within the same register. A sign bit 202 indicates whether or not the number is positive or negative. Typically, the sign bit is the most significant bit in the format. A logic value of 1 may indicate a negative number and a logic value of 0 may indicate a positive number. The exponent 204 may indicate repeated multiplication of the base of the system, which is typically a binary system for processors. The mantissa 206, also referred to as significand, may be an integer or fraction and contains the value of the significant digits of the number. In a 32-bit format, typically, the sign bit 202 is 1 bit, the exponent 204 is 8 bits, and the mantissa 206 is 23 bits. For a representation of an 80-bit floating-point number, the sign bit 202 may be 1 bit, the exponent 204 may be 15 bits, and the mantissa 206 may be 64 bits.

Figure 3:
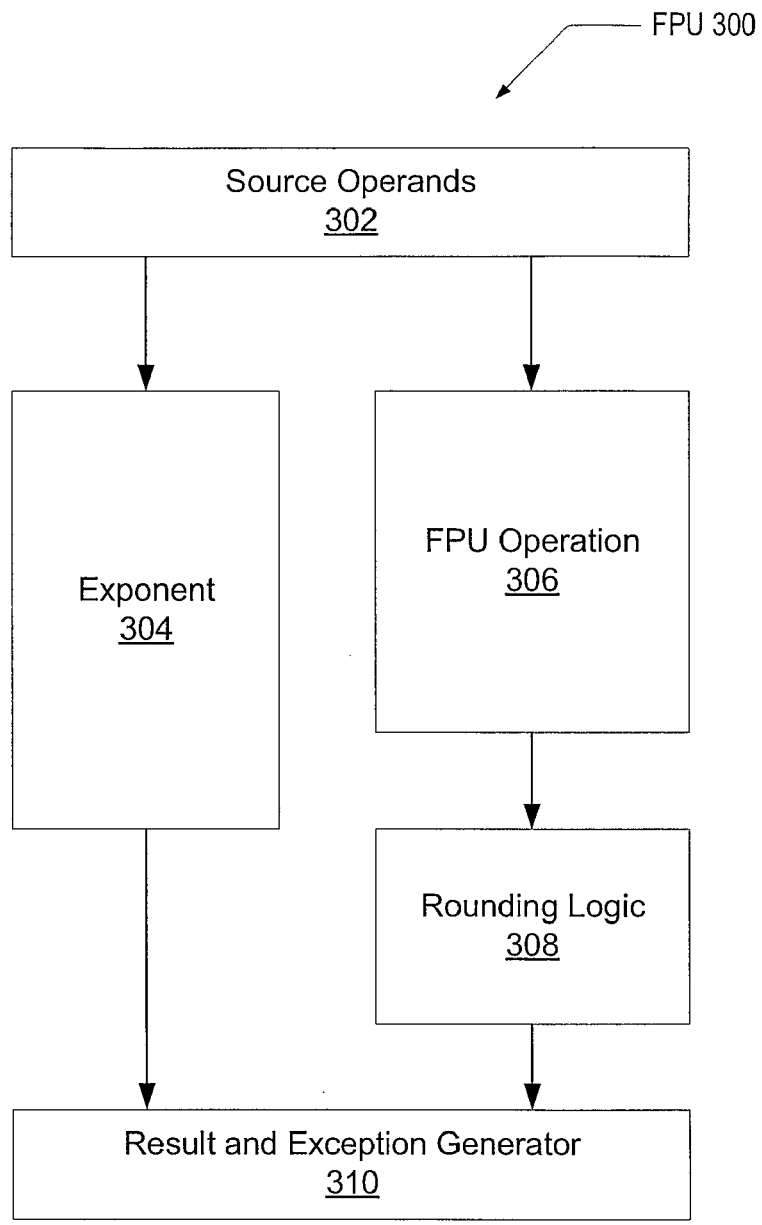
FIG. 3 is a generalized block diagram of one embodiment of accurate accounting of CPI loss.

FIG. 3 illustrates one embodiment of a general block diagram 300 of a FPU. The source operands may be stored in registers in 302 after possibly being selected from a dispatch unit. Depending on the floating-point operation, the operands may be formatted either prior to or during a calculation. For example, a floating-point addition requires a comparison of the exponents. The mantissa, or significand, of the operand with the smaller exponent may be right-shifted a number of digits up to the amount of the difference in exponents. In the exponent block 304, the exponents may be added in the case of a floating-point multiplication or subtracted in the case of a floating-point division. In the FPU Operation block 306, the proper calculation is performed on the mantissas. This block may contain sub-blocks for the different operations such as addition, subtraction, multiplication, division and square root. Logic for normalization of the mantissas may reside in this block. Look-up tables for division results may also reside in this block. The result of the calculation in block 306 may need to be rounded due to the finite number of bits used to represent the result in the processor. Rounding logic 308 is used to perform this task and further details of its possible implementations are provided below. Finally, the rounded result may be loaded into registers in block 310. Also, an exception, such as overflow, may be generated and sent to control logic outside of the FPU.

Figure 4:
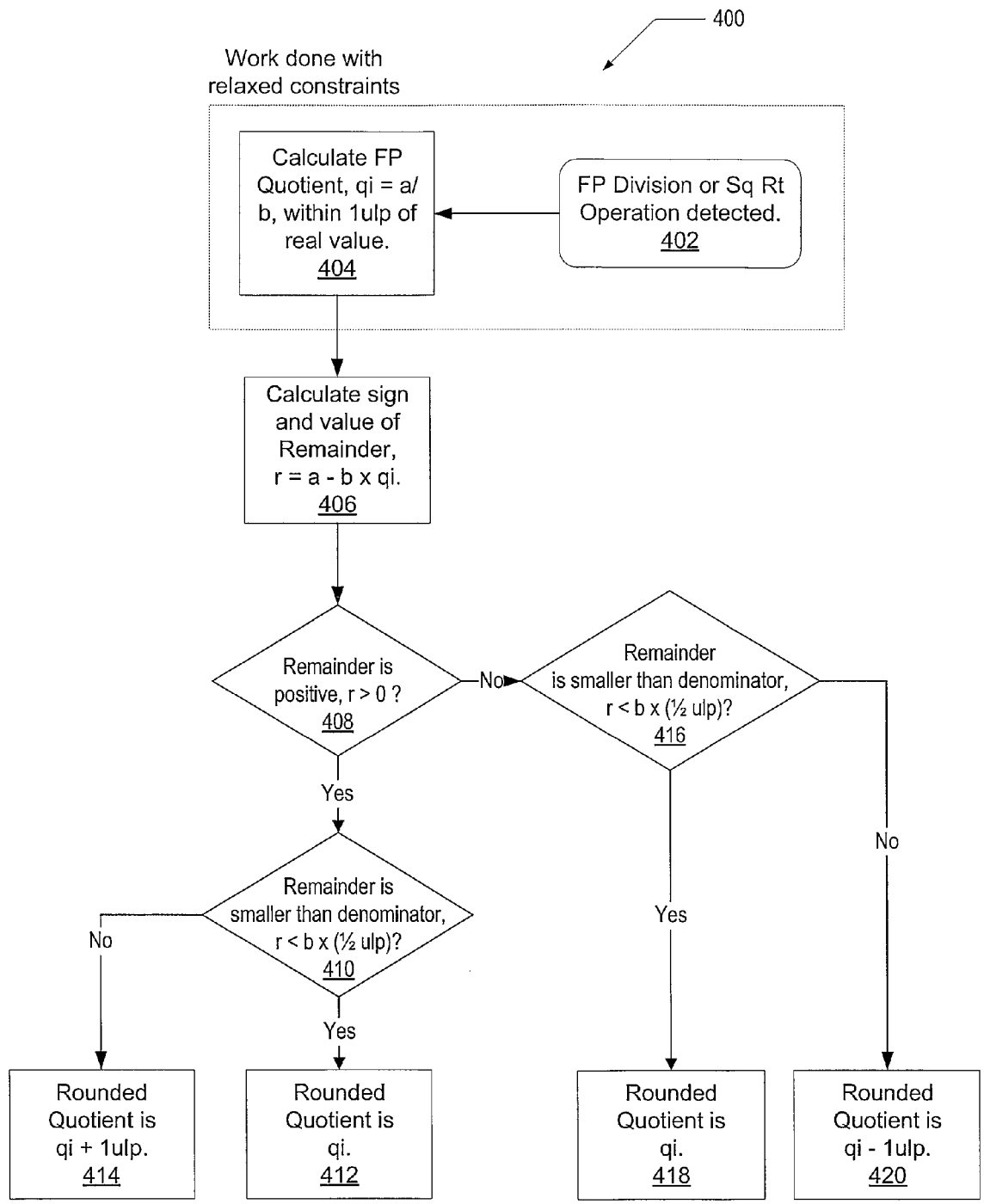
FIG. 4 is a flow diagram of one embodiment of a method for efficient comparison rounding.

Referring to FIG. 4, a flow diagram for a method 400 of comparison rounding is shown. In the embodiment shown, the mathematical computations are performed with positive value inputs. In alternative embodiments, the inputs may have a combination of positive and negative inputs. Method 400 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. In the embodiment shown, a floating-point division or square root operation is detected in block 402. This may involve a FPU receiving an opcode from a decoder and source operands from a register file or reorder buffer. The division operation may be performed in block 404 by methods such as Newton-Raphson or Goldschmidt. Here a division operation of a positive numerator, a, and a strictly positive denominator, b, may be performed where the quotient, $q_i$, is represented by $q_i=a/b$. The square root operation may be performed by methods such as Newton-Raphson, Goldschmidt, exponential identity, Babylonian, or Bakhshali. These operations may use look-up tables and logarithm tables. The size of the tables may be reduced due to relaxed constraints by the invention. For example, the size of a table with 14-bit precision may be reduced up to one half to produce 13-bit precision. The calculated quotient only needs to have precision of 1 ulp, rather than ½ ulp of other rounding methods such as Markstein, AMD K-8 rounding method, and others.

Figure 5A:
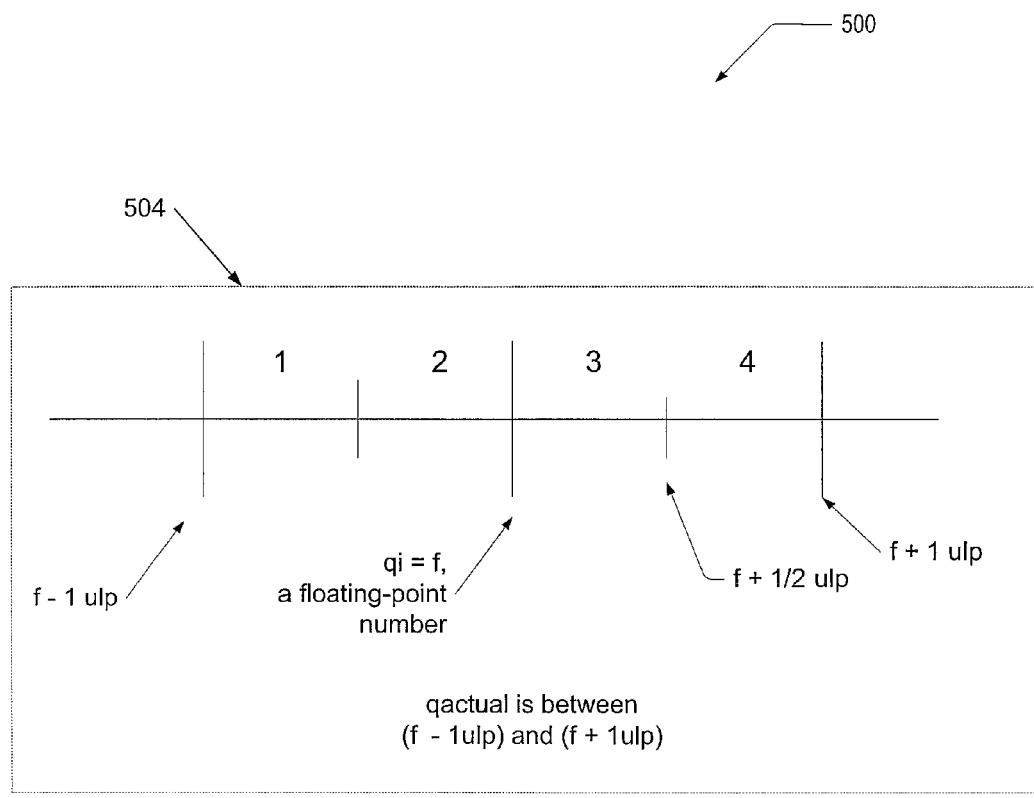
FIG. 5A-5B are block diagrams illustrating one embodiment of an algorithm for efficient comparison rounding.

Next, in block 406, a remainder, r, is calculated where r is represented by $r=a-(b \times q_i)$. Ideally, the value should be zero, but due to the finite precision of a processor, the remainder value may be non-zero. The quotient, $q_i$, is a floating-point number represented by the finite precision of the processor. The value of the actual quotient, $q_{actual}$, represented by infinite precision lies in a range of floating-point numbers between the calculated quotient, $q_i$, minus 1 ulp and $q_i$ plus 1 ulp. Therefore, the rounded result, which will be a floating-point number with finite precision may be one of three values: ($q_i$−1 ulp), $q_i$, or ($q_i$+1 ulp). If $q_{actual}$ lies within +/−½ ulp of $q_i$, then the rounded result will be $q_i$. If $q_{actual}$ has a value lower than ($q_i$−½ ulp), then the rounded result is ($q_i$−1 ulp). Otherwise, if $q_{actual}$ has a value higher than ($q_i$+½ ulp), then the rounded result is ($q_i$+1 ulp). A brief look at block 504 of FIG. 5A illustrates this concept.

Returning to FIG. 4, a comparison is performed in decision block 408. The sign of the remainder may denote if the quotient, $q_{actual}$, may lie to the right or to the left of the calculated quotient, $q_i$. Then a second comparison is performed. This second comparison may aid in knowing if $q_{actual}$ has a value within +/−½ ulp of $q_i$. The background for the second comparison is derived from the above definition of the remainder:

$(q_{actual}-q_i)<½$ ulp;

$r=a-(b \times q_i)=(b \times (a/b))-(b \times q_i)=(b \times q_{actual})-(b \times q_i)=b \times (q_{actual}-q_i)$;

$r<b \times (½$ ulp).

Since the smallest increment or decrement of the processor is set by the least significant bit of the finite representation of the processor, the term, ½ ulp, relates to the number of bits, p, the processor uses in its mantissa. The comparison becomes a parallel subtraction of exponents and mantissas of r and b. The value r will not equal the value of b×(½ ulp), since the processor represents a floating-point number with precision of 1 ulp—the processor can represent, for example, the values ($q_i$−1 ulp), $q_i$, or ($q_i$+1 ulp), but not values in between, such as a granularity of ½ ulp. If the remainder is positive (decision block 408) and the above condition is true (decision block 410), then $q_{actual}$ lies within ½ ulp to the right of $q_i$. Thus, the rounded result should be $q_i$ as in block 412. If the condition of decision block 410 is not satisfied, then r>b×(½) ulp, which signifies $(q_{actual}-q_i)>½$ ulp. This derivation is similar to the derivation above. In this case, $q_{actual}$ lies more than ½ ulp to the right of $q_i$. The rounded result should be ($q_i$+1 ulp) as in block 414. Similar reasoning may be applied to decision block 416 and blocks 418 and 420 for the cases when $q_{actual}$ lies within ½ ulp to the left of $q_i$ and when $q_{actual}$ lies more than ½ ulp to the left of $q_i$.

Figure 5B:
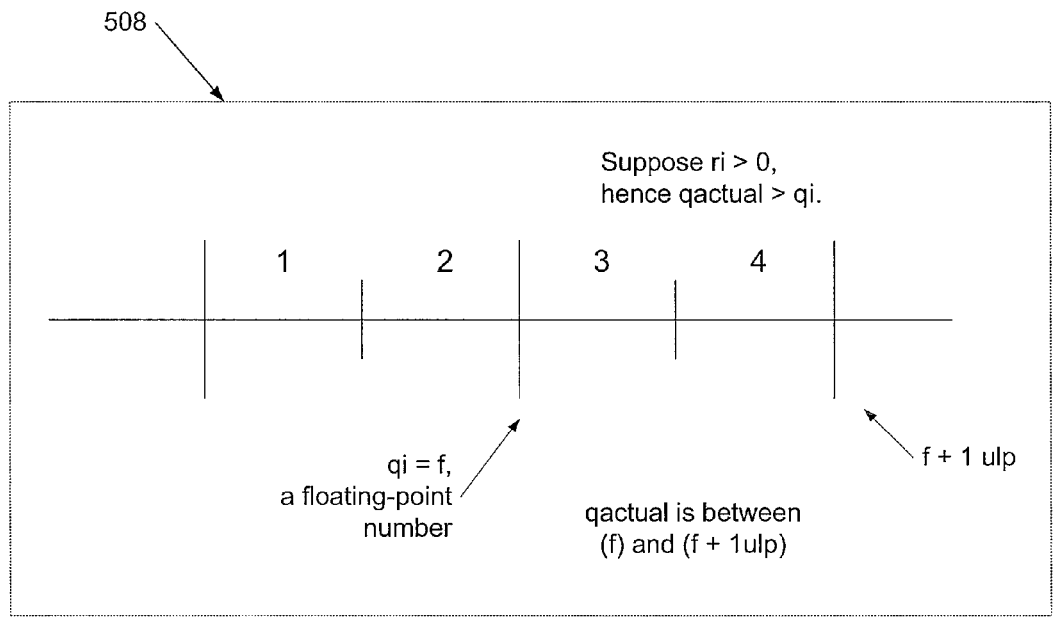

FIG. 5A-5B illustrate a derivation and an algorithm 500 for comparison rounding with relaxed constraints on the calculated quotient as generally shown in FIG. 4. The initial conditions set the relaxed constraint that the processor only needs to use a precision of +/−1 ulp when determining the quotient, versus +/−½ ulp used by other methods. In one embodiment, the values a and b are the numerator and denominator of the calculation, respectively. The quotient qi should be first brought within 1 ulp of $q_{actual}$=a/b. The quotient $q_{actual}$ has infinite precision. Compute qi with only p bits of precision, not (p+1) bits as with some other methods. In this case qi represents an adjacent floating point number to $q_{actual}$.

Block 504 provides an illustration of the rounding problem. It is known that $q_{actual}$ is between (f−1 ulp) and (f+1 ulp). The processor must choose which one of three rounded values, such as (f−1 ulp), f, and (f+1 ulp), it can use to represent the infinite precision result of the division calculation, $q_{actual}$. Correct rounding may be performed if it is determined to which of the four ½ ulp intervals (e.g., 1, 2, 3, or 4) that $q_{actual}$ belongs. This is the equivalent of determining:

1. Which side of $q_{actual}$ is $q_i$?
2. Is $q_i$ further than ½ ulp from qactual?

Computing the sign of the remainder, $r_i=a-(b \times q_i)$, only determines the correct side of q (taking care of no 1 above). This eliminates two of the four ½ ulp intervals where $q_{actual}$ can lay.

For condition no 2 (all values are absolute values):
if $(q_{actual} - q_i < \frac{1}{2}$ ulp) then:
$r_i = a - b \times q_i$
$r_i = b \times (q_{actual} - q_i)$
$r_i < b \times (\frac{1}{2}$ ulp$)$
if $(q_{actual} - q_i > \frac{1}{2}$ ulp) then:
$r_i > b \times (\frac{1}{2}$ ulp$)$ The term $(b \times (\frac{1}{2}$ ulp$))$ is a scaled version of b. Determining whether $r_i < b \times (\frac{1}{2}$ ulp$)$ or $r_i > b \times (\frac{1}{2}$ ulp$)$, for a precision p bits, corresponds to comparing:
mantissas of $r_i$ and b;
(exponent of $r_i$) and (exponent of b$-$(p));
And the problem reduces to determining the corresponding signs:
sign of ((mantissa of $r_i$)$-$(mantissa of b));
sign of ((exponent of $r_i$)$-$((exponent of b)$-$(p)));

Block 508 of FIG. 5B illustrates a narrowing of the choices when the first condition above is determined. The calculation above for condition no. 2 (pertaining to block 504) derives the comparison needed to determine if $q_i$ is further than $\frac{1}{2}$ ulp from $q_{actual}$. This derivation is the same as the description for decision blocks 410 and 416 in FIG. 4 above. The final decision making uses the results of the sign of the remainder and the comparisons between the remainder and the denominator. In particular,
$r_i > b \times (\frac{1}{2}$ ulp$)$ if:
((exponent of $r_i$)$-$((exponent of b)$-$(p)))$>0$,
or
((exponent of $r_i$)$-$((exponent of b)$-$(p)))$=0$ and (mantissa of $r_i$$-$mantissa of b)$>0$.
Otherwise, $r_i < b \times (\frac{1}{2}$ ulp$)$.
Finally, the interval where $q_{actual}$ may reside:
If $r_i > 0$, and (mantissa of $r_i$)$>$(mantissa of b), then qactual resides in interval 4, and rounded qi=f+1 ulp.
If $r_i >= 0$, and (mantissa of $r_i$)$<$(mantissa of b), then qactual resides in interval 3, and rounded qi=f.
If $r_i < 0$, and (mantissa of $r_i$)$>$(mantissa of b), then qactual resides in interval 1, and rounded qi=f$-$1 ulp.
If $r_i < 0$, and (mantissa of $r_i$)$<$(mantissa of b), then qactual resides in interval 2, and rounded qi=f.

Figure 6A:
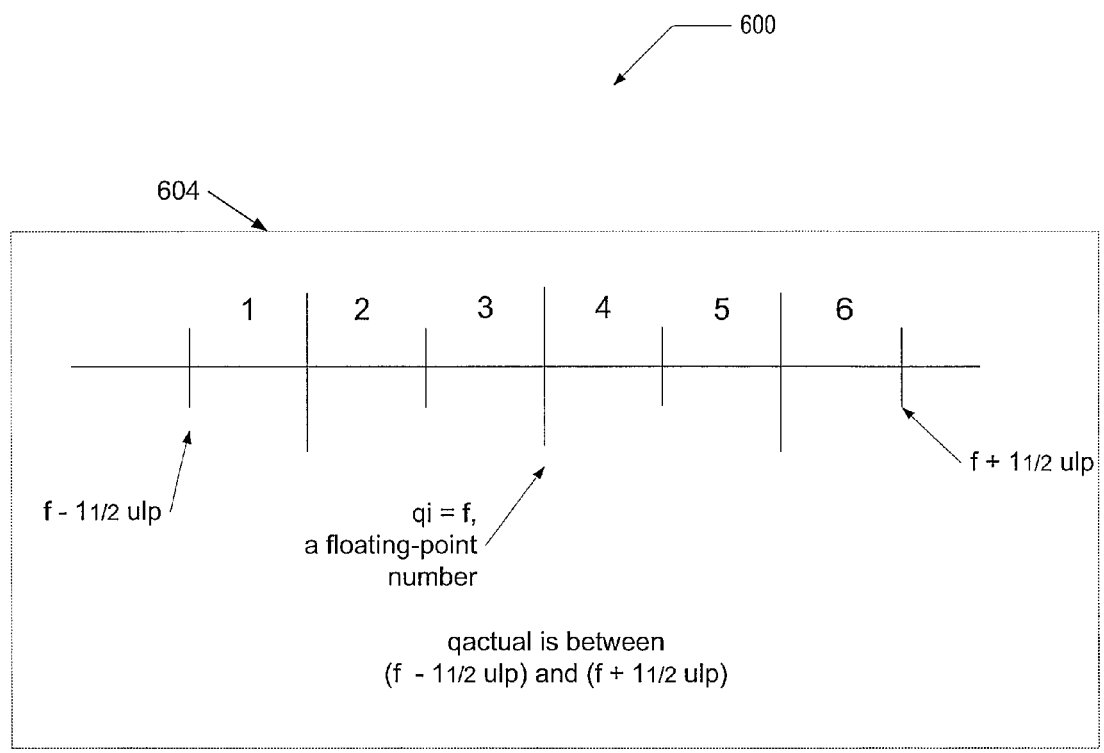

FIG. 6A-6B illustrates a derivation and algorithm 600 similar to the above for comparison rounding with relaxed constraints on the calculated quotient. However, here the constraint is further relaxed from +/$-$1 ulp to +/$-$1½ ulp, which may lead to further area savings by size reductions in look-up and logarithm tables. This scheme may be extended to qi accurate to within +/$-$1½ ulp (as opposed to just +/$-$1 ulp). Now, correct rounding may be performed if it is determined to which of the six ½ ulp intervals (e.g., 1-6) that qactual belongs. Block 604 shows a diagram illustrating the six possible ½ ulp intervals where $q_{actual}$ may lie.

Block 606 illustrates the derivations similar to those discussed above in order to determine the correct rounded value to represent the actual quotient of infinite precision. Here, the number of intervals has increased and an extra comparison is needed between the remainder and the denominator. However, this extra comparison involves a subtraction with the value (p$-$1) and circuit and/or software techniques may be used rather than perform a separate, parallel subtraction with the value p that is already needed. Also, rather than perform all comparisons listed in block 606, in one embodiment, only the first and third comparisons may be performed in parallel. If the conditions of these comparisons are not satisfied, then it is known the second comparison is true. The final decision making that uses the results of the sign of the remainder and the comparisons between the remainder and the denominator is shown in block 608.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processing device implemented method comprising:
initiating a division operation in the processing device, wherein said operation comprises dividing a first operand by a second operand;
calculating an intermediate floating-point (FP) quotient of the division operation with a first number of precision bits less than or equal to a second number of precision bits used by the processing device to represent a FP numeric value;
determining a sign and a magnitude of a single remainder of the division operation;
selecting the intermediate FP quotient to be a final FP quotient, in response to determining the magnitude of the single remainder is less than a given threshold;
in response to determining the magnitude of the single remainder is not less than the given threshold:
selecting a sum of the intermediate FP quotient and one unit in last place (ulp) to be the final FP quotient, in response to determining the sign of the single remainder is greater than zero; and
selecting a difference of the intermediate FP quotient and one ulp to be the final FP quotient, in response to determining the sign of the single remainder is less than zero.

2. The processing device implemented method as recited in claim 1, wherein the given threshold is a product of the second operand and one-half of the ulp.

3. The method as recited in claim 2, further comprising determining a difference between a mantissa of the single remainder and a mantissa of the second operand.

4. The processing device implemented method as recited in claim 3, further comprising determining a difference between (i) an exponent of the single remainder and (ii) a difference of an exponent of the second operand and said first number of precision bits.

5. The processing device implemented method as recited in claim 2, wherein determining the sign and the magnitude of the single remainder comprises determining a difference between (i) the first operand and (ii) a product of the second operand and the intermediate FP quotient.

6. The processing device implemented method as recited in claim 2, wherein the first operand and the second operand are used in a FP square-root operation.

7. The processing device implemented method as recited in claim 2, wherein the first operand and the second operand are used in a FP division operation.

8. The processing device implemented method as recited in claim 1, further comprising expanding said selecting as the first number of precision bits decrease.

9. A processor comprising:
a floating-point unit, wherein the floating point unit is configured to:
initiate a division operation in the processing device, wherein said operation comprises dividing a first operand by a second operand;
calculate an intermediate floating-point (FP) quotient of the division operation with a first number of precision bits less than or equal to a second number of precision bits used by the processing device to represent a FP numeric value;
determine a sign and a magnitude of a single remainder of the division operation;
select the intermediate FP quotient to be a final FP quotient, in response to determining the magnitude of the single remainder is less than a given threshold;
in response to determining the magnitude of the single remainder is not less than the given threshold:
select a sum of the intermediate FP quotient and one unit in last place (ulp) to be the final FP quotient, in response to determining the sign of the single remainder is greater than zero; and
select a difference of the intermediate FP quotient and one ulp to be the final FP quotient, in response to determining the sign of the single remainder is less than zero.

10. The processor as recited in claim 9, wherein the given threshold is a product of the second operand and one-half of the ulp.

11. The processor as recited in claim 10, further comprising determining a difference between a mantissa of the single remainder and a mantissa of the denominator.

12. The processor as recited in claim 11, further comprising determining a difference between (i) an exponent of the single remainder and (ii) a difference of an exponent of the denominator and said first number of precision bits.

13. The processor as recited in claim 10, wherein determining the sign and the magnitude of the single remainder comprises determining a difference between (i) the first operand and (ii) a product of the second operand and the intermediate FP quotient.

14. The processor as recited in claim 10, wherein the first operand and the second operand are used in a FP square-root operation.

15. The processor as recited in claim 14, wherein the floating point unit is further configured to expand said selecting as the first number of precision bits decrease.

16. The processor as recited in claim 10, wherein the first operand and the second operand are used in a FP division operation.

17. A floating point unit comprising:
logic configured to:
initiate a division operation in the processing device, wherein said operation comprises dividing a first operand by a second operand; and
calculate an intermediate floating-point (FP) quotient of the division operation with a first number of precision bits less than or equal to a second number of precision bits used by the processing device to represent a FP numeric value; and
rounding logic configured to:
determine a sign and a magnitude of single remainder of the division operation;
select the intermediate FP quotient to be a final FP quotient, in response to determining the magnitude of the single remainder is less than a given threshold;
in response to determining the magnitude of the single remainder is not less than the given threshold:
select a sum of the intermediate FP quotient and one unit in last place (ulp) to be the final FP quotient, in response to determining the sign of the single remainder is greater than zero; and
select a difference of the intermediate FP quotient and one ulp to be the final FP quotient, in response to determining the sign of the single remainder is less than zero.

18. The floating point unit as recited in claim 17, further comprising determining a difference between a mantissa of the single remainder and a mantissa of the second operand.

19. The floating point unit as recited in claim 18, further comprising determining a difference between (i) an exponent of the single remainder and (ii) a difference of an exponent of the denominator and said first number of precision bits.

20. The floating point unit as recited in claim 19, wherein determining the sign and the magnitude of the single remainder comprises determining a difference between (i) the first operand and (ii) a product of the second operand and the intermediate FP quotient.

* * * * *